Gerald C. Summers
Robert L. Mills
INVENTORS

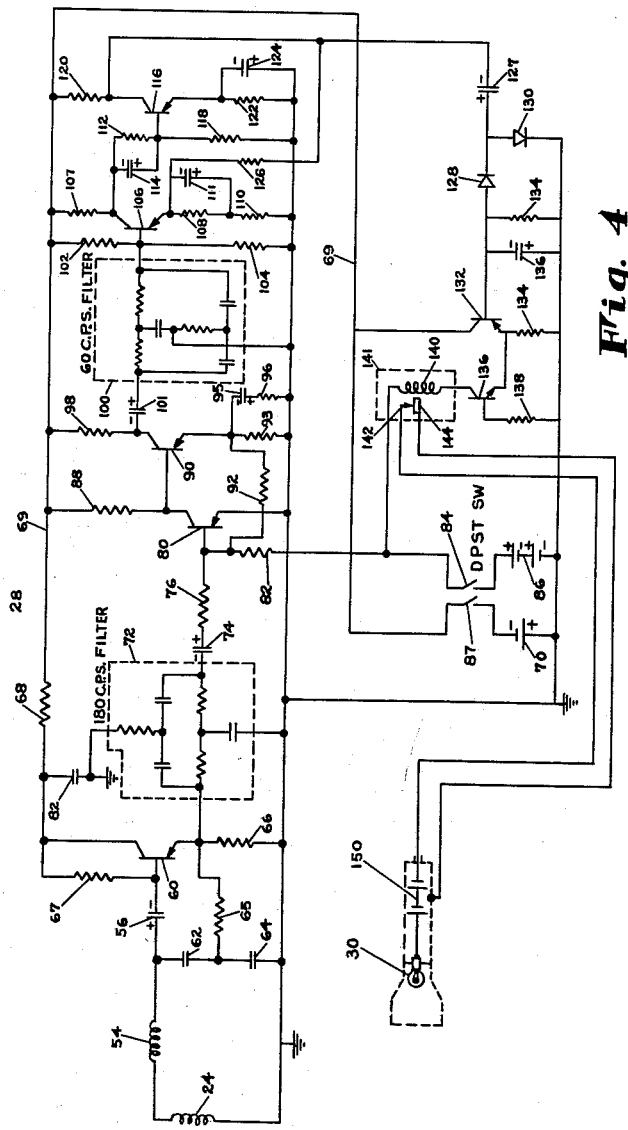
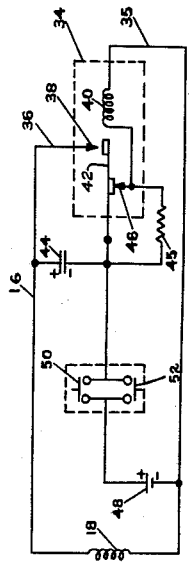
Fig. 4
Fig. 3
Gerald C. Summers
Robert L. Mills
INVENTORS
BY Watson, Cole, Grindle & Watson
ATTORNEYS Patented Jan. 9, 1962

3,016,515
VEHICLE TIRE PRESSURE ALARM APPARATUS
Gerald C. Summers and Robert L. Mills, Dallas, Tex., assignors to Metallurgical Resources, Inc., Dallas, Tex., a corporation of Delaware
Filed Aug. 31, 1959, Ser. No. 837,237
6 Claims. (Cl. 340—58)

This invention relates to fluid pressure alarm apparatus and more particularly to tire pressure alarm apparatus.

Priorly, numerous types of devices have been employed to render an indication of an improper tire pressure condition. However, these devices are very complex and exhibit numerous disadvantages. For example, one known type of these devices employs individual radio frequency transmitters in each of the wheels and a radio frequency receiver located in the cab. Such an arrangement presents problems with regard to the radiation of electromagnetic waves in view of the large mass of metallic strcture employed in vehicles such as the tractor-trailer type. The transmitters located in the wheels may radiate energy away from the wheels but this energy is not directed toward the cab since such direction is blocked by the large trailer body and portions of the cab structure.

Another known type of tire gauge employs a spark gap transmitter connected to the spark plugs of the engine, and this spark gap transmitter is inductively coupled to a parallel circuit including a coil and a capacitor located on each of the wheels. The capacitor is variable and the capacity is mechanically controlled by the pressure of the tire. A receiving circuit is inductively coupled to the previously mentioned parallel circuit and includes an indicator to give a visual indication of the energy transferred from the spark gap circuit to the parallel circuit located on the wheels. In this device three separate circuits are employed to achieve the desired result. These circuits must be isolated to an extent since the spark gap circuit must not be inductively coupled to the receiver circuit by any means other than the resonant circuit located on the wheel.

We have discovered that a simplified and improved device may be produced by the use of a plurality of low frequency transmitters located on each of the wheels and inductively coupled to a single pickup coil, which pickup coil is positioned to utilize the mass of magnetic material included in the wheel axles. The use of low frequency transmitters simplifies the problem of generation of the signals and further simplifies the coupling between the circuits. Advantageously, a receiver may be mounted adjacent the coil and connected to a signal light or other device conveniently positioned to be seen by the driver. For example, the light may be located on the trailer, thus eliminating the necessity for connecting wires from the trailer to the tractor. Also, advantageously, the transmitters may include coils which encircle the wheel axle such that the magnetic field induced by these coils will extend through the wheel axle.

Accordingly, it is an object of this invention to provide an improved fluid pressure responsive warning device.

It is another object of this invention to provide an improved tire pressure warning device which is simple in construction, reliable in operation and economical to construct.

It is another object of this invention to provide an improved vehicle tire pressure warning system which is free of the above enumerated disadvantages.

Briefly, in accordance with aspects of this invention, a mechanical vibrator is connected to a battery through pressure switches. A transmitting coil is also connected to the vibrator and the battery in a manner such that pulses of current are caused to flow through said transmitting coil as the vibrator operates. As the current increases at the onset of the pulse and decreases at the conclusion of the pulse, an alternating magnetic field is generated which links the transmitting coil. A single transmitter may be employed for both wheels of a dual set and individual pressure switches located in each of the wheels of the dual set may be connected in parallel in the transmitter circuit.

In accordance with other aspects of this invention, the transmitting coil encircles the axle to establish an alternating magnetic flux through the wheel axle when the transmitter is energized.

In accordance with still other aspects of this invention, a receiver coil is mounted adjacent the axle to receive variations in the magnetic field caused by the transmitter coil. Accordingly, the magnetic materials in the wheel axle are employed to increase the coefficient of coupling between the transmitter and receiver coils. The low frequencies employed, namely, of the order of 10 to 200 cycles per second, facilitate the use of large masses of magnetic material to define a coupling between the transmitter and receiver coils. Further, the use of these low frequencies reduces the power required by the transmitter to achieve satisfactory operation. Still further, this arrangement of apparatus permits a single receiving coil to co-operate with two transmitting coils. The receiving coil may, advantageously, be located in the region of the center of the axle and may encircle the axle. The flux established by the transmitter on either end of the axle will thus induce a current in the receiver coil and, therefore, actuate the visual alarm device connected to the receiver.

In accordance with still other aspects of this invention, a transistorized receiver is employed to deliver an electrical indication in response to low frequency variations in the magnetic flux reaching the receiver coil. Advantageously, this receiver is simple in construction because of the use of low frequency signals. For example, each of the several stages of the receiver may be resistive coupled. The main advantage of the low frequency receiver is that inexpensive transistors can be used. Radio frequency transistors are, in general, more expensive than those which will operate only in the lower frequency ranges.

These and various other objects and features of this invention will be more clearly understood with a reading of the detailed description in conjunction with the drawings, in which:

FIGURE 3 is a schematic representation of one illustrative embodiment of the transmitter; and FIGURE 4 is a schematic representation of one illustrative embodiment of the receiving apparatus including the visual indicator.

Figure 1:
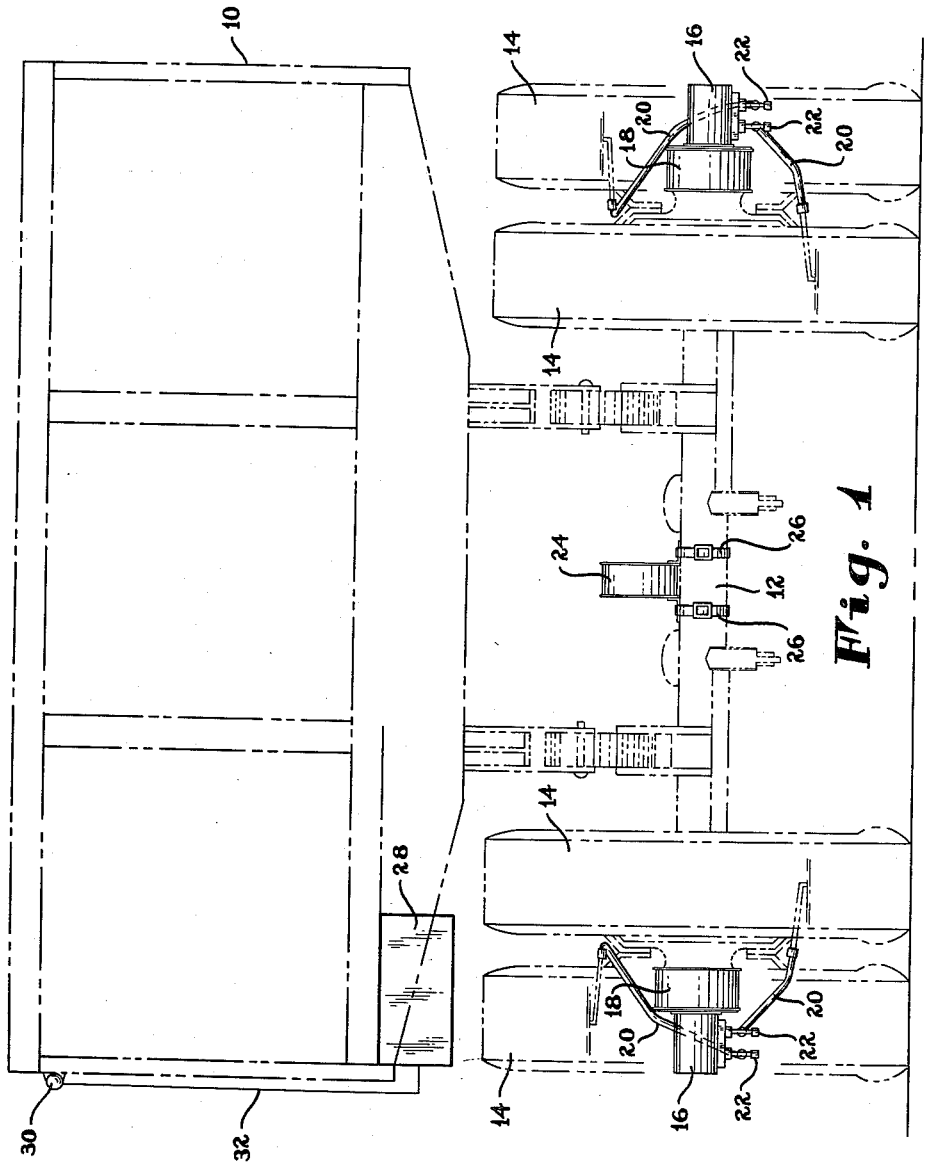
FIGURE 1 is a pictorial view in elevation, partly in section, of portions of one illustrative embodiment of the invention as viewed from the rear of the vehicle.

Referring now to FIGURE 1, there is depicted a trailer 10 mounted on an axle 12 and having wheels 14, with tires on them, mounted on the axle 12.

Transmitters 16 are mounted on the hubs of wheels 14 at the ends of axle 12 and these transmitters include transmitter coils 18 which encircle the axle and induce a magnetic field in the axle 12 when the transmitter is actuated. The tire on each wheel 14 is connected through a suitable tube 20 to a pressure actuated switch 22, which pressure actuating switch is connected in the transmitter circuit in a manner which will be subsequently explained. A receiver coil 24 is mounted on the axle 12 by suitable means such as by straps 26. A receiver 28 is connected to the receiver coil 24 by suitable wires, not shown. A signal lamp 30 is connected to the output of the receiver 28 by suitable wires such as wire 32.

Figure 2:
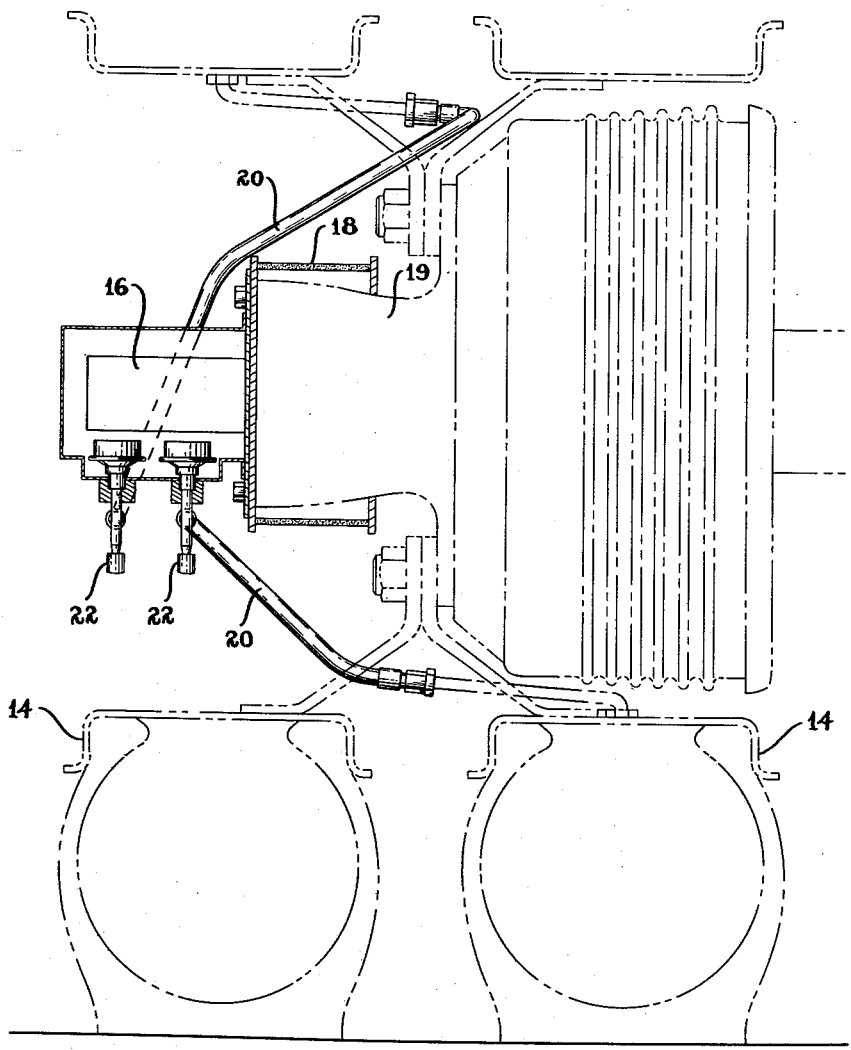
FIGURE 2 is a view in elevation, to an enlarged scale, of a portion of FIGURE 1.

Referring now to FIGURE 2, there is depicted, to an enlarged scale, the left-hand portion of FIGURE 1 shown in elevation, partly in section. As therein depicted, a coil 18 is shown to contain a number of turns wound around the hub 19. Since the hub 19 is an integral portion of the wheel and rotates with the wheel, any convenient form of electrical connections between the transmitter 16 and the coil 18 may be employed.

FIGURE 3 shows a schematic representation of one illustrative form of the transmitter 16 in which the transmitting coil 18 is connected to vibrator 34 by a pair of leads 35 and 36. Lead 36 is connected to one of the contacts 38 of the vibrator while lead 35 is connected to the coil 40 of the vibrator. The armature 42 of the vibrator 34 is connected through a suitable capacitor 44 to the lead 36. Capacitor 44 is also connected with the armature 42 and a resistor 45. The resistor 45 is connected to a contact 46 of the vibrator 34 and is connected to coil 40. The negative terminal of a suitable battery 48 is connected through lead 35 to coil 40 and the positive terminal may be connected through either of the pressure responsive switches 50 or 52 to the armature 42 of the vibrator 34 and the opposite terminal of coil 40. The operation of the transmitter will now be described in detail.

When either one of the pressure switches 50 or 52 is released due to a decrease in the air pressure of the associated tire, the circuit between the battery 48 and the vibrator armature 42 will be closed. The closing of this circuit causes current flow through the vibrator coil 40, causing a build-up of magnetic flux around this coil. This build-up of magnetic flux causes the armature to move away from the contact 46, thus breaking the coil-battery circuit. The armature continues to travel until the armature 42 closes the contact 38. At this instant current begins to flow in the transmitting coil and a magnetic field is established around it. Because of its resilience, the armature 42 does not remain in a position to keep contact 38 closed, but returns to its initial position in which contact 38 is open and contact 46 is closed. As contact 38 opens, current ceases to flow in the transmitting coil and the field about this coil first reverses direction and then collapses. As contact 46 closes coil 40 is again energized by current flow through it and another cycle of operation similar to the one just described is started. This periodic opening and closing of the contacts and the attendant production of current pulses in the transmitting coil continues as long as either switch 50 or 52 remains closed. The frequency of the pulses is the same as the frequency of the closures of contact 38, and this is determined by the inertia of the armature mass and the stiffness of the armature. Because of practical physical limitations on the mass and stiffness of the armature 42 this frequency will be low.

The low frequency pulses through the transmitting coil 18 produce alternating magnetic flux through and around the axle 12, shown in FIGURE 1, in a manner well known in the art. This magnetic flux will cause currents to be induced in the receiver coil 24 in a manner also well known in the art.

Condenser 44 and resistor 45 which were not mentioned in the above description of operation are not essential to the operation of the transmitter. They were shown in the diagram and are preferably used in the system for suppressing damaging arcs on contacts 38 and 46 as the contacts are opened while the vibrator is in operation.

The use of this low frequency transmitter has numerous advantages. For example, all of the parts are rugged in construction. Further, the parts are such that only a limited amount of servicing will be necessary. Still further, the low frequency pulses will induce changes in the magnetic flux in and around the axle, whereas if a radio frequency signal were employed, the metallic material in the axle and the axle would act as a shield to prevent the transmission of these pulses to the receiver coil 24.

Advantageously, the vibrator may be mounted on the wall of the wheel which is vertical and oriented perpendicular to the axle of the wheel in the manner such that the armature lies in a vertical plane. With this arrangement, vibrations imparted to the wheel from the road will not cause the armature to vibrate.

Referring now to FIGURE 4, there is depicted a schematic representation of an illustrative receiver 28 employed in this apparatus. The receiver coil 24 is connected through an inductor 54 and a capacitor 56 to the base of transistor 60. A pair of condensers 62 and 64 are serially connected between the inductor 54 and the capacitor 56 and the opposite side of receiver coil 24. Resistor 65 is connected between mid-point of capacitors 62 and 64 and the emitter of transistor 60. The emitter of transistor 60 is connected to ground through resistor 66. The collector of transistor 60 is connected to the base through resistor 67. The collector of transistor 60 is connected through resistor 68 and leads 69 to a suitable battery 70. The circuit between the detector coil 24 and the connection from the emitter of transistor 60 to filter 72 is called a "Q multiplier." It amplifies to a greater degree the signal at a frequency determined by the values of inductor 54 and condensers 62 and 64. Resistors 67 and 68 and condenser 82 do not affect the operation of the circuit as a Q multiplier. Resistor 67 functions to bias the transistor for proper operation. The network of resistor 68 and condenser 82 is a decoupling network. Its function is to act as a buffer between the Q multiplier and the other stages of the receiver. The emitter of transistor 60 is connected through a filter circuit 72, a capacitor 74 and a resistor 76 to the base of transistor 80.

Advantageously, filter circuit 72 is in the form of a single frequency rejection filter which is tuned to absorb frequencies of the order of 180 cycles per second. The object of the filter circuit is to absorb the third harmonic of the power line transmission frequency of 60 cycles. During the course of testing this equipment it was determined that the currents induced in the receiver coils from the power line, if amplified, could falsely actuate the visual indicator and thus give a false alarm signal.

The collector of transistor 60 is connected to ground through a capacitor 82 to bypass currents of the frequencies above the desired range. The base of transistor 80 is connected through a resistor 82 and switch 84 to a battery 86. Switch 84 is mechanically coupled to a second switch 87 which controls the circuit between the battery 70 and lead 69. The emitter of transistor 80 is connected to ground or reference potential. The collector of transistor 80 is connected to resistor 88 and to the base of transistor 90. The emitter of transistor 90 is connected through a resistor 92 to the base of transistor 80. The emitter of transistor 90 is also connected to ground or reference potential through a resistor 93. The emitter of transistor 90 is also connected to ground through a series circuit defined by capacitor 95 and resistor 96. The collector electrode of transistor 90 is connected through a resistor 98 to the lead 69 for the purpose of supplying current to the collector from the battery 70. The collector of transistor 90 is connected to a filter circuit 100 through a capacitor 101.

The stage consisting of transistors 80 and 90 and the associated resistors and condensers is an amplifying stage with compensation to prevent changes in amplification as the batteries supplying power become discharged and as the characteristics of the transistors change when the temperature of the ambient air changes. Resistors 76, 82 and 92 and the network consisting of condenser 95 and resistor 96 are the circuit elements which produce this compensation. The other elements of this stage perform standard biasing and loading functions.

Advantageously, the filter circuit 100 is a single frequency rejection filter which is similar to filter 72. It rejects the 60-cycle current which might be induced in the receiver coil from the power line adjacent the road. A voltage divider network including resistors 102 and 104 is connected between the lead 69 and the source of reference potential. The output lead of filter 100 is connected to a point between resistors 102 and 104 and is also connected to the base of transistor 106. The collector of transistor 106 is connected through a resistor 107 to the battery lead 69. A pair of resistors 108 and 110 are serially connected between the emitter of transistor 106 and ground or reference potential.

A capacitor 111 is connected in parallel with resistor 108 to define a bypass for currents above the desired frequency rate. The collector of transistor 106 is connected through a parallel resistor-condenser network 112 and 114, respectively, to the base of transistor 116. The base of transistor 116 is also connected to ground or reference potential through resistor 118. Resistor 120 is connected between the collector electrode of resistor 116 and the battery lead 69. The emitter electrode of transistor 116 is connected to ground or reference potential through a parallel network defined by resistor 122 and capacitor 124. A feedback loop is defined between the collector electrode of transistor 116 and the emitter electrode of transistor 106 by resistor 126.

The stage consisting of transistors 106 and 116 is another compensated amplifying stage. In this case different means of compensation are employed. Resistors 102 and 104 provide a stable bias point for the base of transistor 106. The voltage across resistor 110 and the portion of the output voltage feedback through resistor 126 establish the emitter bias for transistor 106. Resistors 112 and 118 establish the bias for the base of transistor 116, since it is returned to the collector of transistor 106, couples the signal from transistors 106 and 116. Condensers 114, 111, and 124 are by-pass condensers used to improve the operation of the stage at the signal frequency.

A coupling capacitor 127 is connected between the collector electrode of transistor 116 and a rectifier network of rectifiers 128 and 130. The opposite side of rectifier 128 is connected to the base of transistor 132 while the opposite side of rectifier 130 is connected to ground or reference potential. The network made up of condenser 127, diodes 128 and 130, and condenser 136 is a peak rectifying, or voltage doubling circuit, which accomplished the production of a constant (direct current) potential proportional to the peak-to-peak alternating potential at the collector of transistor 116. The D.C. potential with the indicated diode connections will be negative. The base of transistor 132 is connected to ground through a parallel network defined by resistor 134 and capacitor 136. Resistor 134 provides bias for the base of transistor 132, which is used as an "emitter follower."

The collector electrode of transistor 132 is connected to the battery lead 69 while the emitter electrode is connected to ground through a suitable resistor 134. The emitter electrode of transistor 132 is also directly connected to the emitter electrode of transistor 137, which is operated in the driven emitter configuration (grounded base) to operate relay 141. The base of transistor 137 is connected to ground or reference potential through a suitable resistor 138. The collector electrode of transistor 137 is connected to a suitable coil 140. The opposite side of coil 140 is connected through switch 84 to battery 86. Operatively associated with coil 140 are a pair of contacts 142 and 144. Contacts 142 and 144 are connected in a series circuit including lamp 30 and battery 150.

The operation of the receiver is as follows: When a current is induced in the receiving coil 24, this current is applied to transistor 60, amplified thereby and transmitted through the filter 72 to the transistor 80. Transistor 80, in turn, amplifies the signal and transmits this signal to transistor 90. Transistor 90 again amplifies the signal and transmits it through capacitor 101 and filter 100 to transistor 106. Transistor 106 amplifies the signal and transmits it to transistor 116. Transistor 116 sends the signal to the rectifiers 128 and 130, which pass only the pulses of negative polarity to the base of transistor 132. Transistor 132 amplifies the signal and transmits the signal from its emitter to the emitter of transistor 136. Transistor 136 amplifies this signal and sends it through its collector electrode and coil 140, which coil is a portion of relay 141. Current through the coil 141 actuates the contacts 142 and 144 to their closed circuit position. When contacts 142 and 144 are closed, they complete the circuit for battery 150 through the light 30. The light 30 is, advantageously, mounted on the side of the vehicle in a position to be viewed through the rear view mirror, as best seen in FIGURE 1. Accordingly, the driver will note the actuation of light 30 and stop the vehicle to repair the defective tire.

Although only one receiver coil 24 has been shown and described, it is understood that these receiver coils may be employed in any locality where it is desired to pick up variations in the magnetic fields from the tire pressure responsive transmitters. For example, a similar coil may be mounted near the front trailer wheels and a coil may be mounted in the region of the front tractor axle to indicate decreases in pressure on the adjacent tires.

While various embodiments of our invention have been shown and described, it is understood that the principles thereof may be extended to many and varied types of machines and apparatus. The invention, therefore, is not to be limited to the details illustrated and described herein.

What is claimed is:

1. A low frequency tire pressure warning apparatus comprising an inductance coil mounted for rotation with said tire and disposed concentrically around the axle upon which said tire is mounted, switching means and a source of unidirectional current connected in series with said coil, means mounted on said tire and connected to said switching means to actuate said switching means in response to low pressure in said tire periodically to energize said coil at a low repetition rate thereby to generate low frequency magnetic fields in a magnetic path including said axle, a receiving coil supported adjacent to said axle and adapted to link the magnetic flux in said axle for receiving a signal from said inductance coil when said tire pressure is low, receiver means connected to said receiving coil for amplifying the current induced in said receiving coil by said variations in said magnetic fields, said recevier means including an output circuit having an indicator means for producing a sensible signal in response to currrents of said low frequency in said receiving coil.

2. A tire pressure responsive warning apparatus including low frequency transmitter means for transmitting a low frequency signal indicative of a faulty tire pressure condition and including a transmitting coil mounted for rotation with said tire and the windings of which encircle the axle upon which said tire is mounted, an excitation circuit for said coil including in series a source of unidirectional current, a control switch, and a vibrator, switch actuating means including a tire pressure sensing element connected to said control switch to close said control switch when pressure in said tire is below a predetermined level, a receiver coil mounted in fixed relation with respect to said axle and oriented as to be coupled to the magnetic flux in said axle for production of a voltage therein upon energization of said transmitting coil, receiving means connected to said coil and including a plurality of amplifier stages at least one of which stages is connected to said receiver coil and said receiving means also including a relay connected to an output stage of said amplifier, and an indicator connected in circuit with said relay and adapted to be energized in response to closure of said relay upon closure of said control switch.

3. A low frequency warning apparatus for a pneumatic tire mounted on a wheel, the hub of which is mounted on an axle, which comprises an inductance coil mounted on said hub and having windings disposed concentrically with respect to said axle, low frequency switching means adapted to be actuated when pressure in said tire is low, a source of unidirectional current connected in series with said coil and with said switching means for producing pulsed current flow at said low frequency through said inductance coil to produce pulsed magnetic fields in said axle in response to low pressure in said tire, a receiving coil supported adjacent to said axle and linked to magnetic flux passing through said axle for production of signal pulses from said inductance coil when said tire pressure is low, and a circuit including an indicator means connected to said receiving coil for signaling the existence of low tire pressure.

4. A low frequency warning apparatus for a pneumatic tire mounted on a wheel, the hub of which is mounted on an axle, which comprises an inductance coil mounted on said hub and having windings disposed concentrically with respect to said axle, low frequency switching means adapted to be actuated when pressure in said tire is low, a source of unidirectional current connected in series with said coil and with said switching means for producing pulsed current flow at said low frequency through said inductance coil to produce pulsed magnetic fields in said axle in response to low pressure in said tire, a receiving coil supported adjacent to said axle and linked to the magnetic flux passing through said axle for production of signal pulses from said coil when said tire pressure is low, and a circuit connected to said receiving coil including means for filtering extraneous stray power frequency signals from said signal pulses and further including an indicator means for signaling the existence of low tire pressure.

5. A low frequency warning apparatus for a pneumatic tire mounted on a wheel, the hub of which is mounted on an axle, which comprises an inductance coil mounted on said hub and having windings disposed concentrically with respect to said axle, low frequency switching means including a switching vibrator element adapted to be actuated when said tire pressure is low, means for mounting said vibrator element in a vertical plane perpendicular to said axle, a source of unidirectional current connected in series with said coil and with said switching means for producing pulsed current flow at said low frequency through said inductance coil to produce pulsed magnetic fields in said axle in response to low pressure in said tire, a receiving coil supported adjacent to said axle and linked to the magnetic flux passing through said axle for production of signal pulses from said coil when said tire pressure is low, and a circuit connected to said receiving coil including means for filtering extraneous stray power frequency signals from said signal pulses and further including an indicator means for signaling the existence of low tire pressure.

6. A low frequency warning apparatus for a pneumatic tire mounted on a wheel, the hub of which is mounted on an axle, which comprises an inductance coil mounted on said hub and having windings disposed concentrically with respect to said axle, low frequency switching means adapted to be actuated when pressure in said tire is low, a source of unidirectional current connected in series with said coil and with said switching means for producing pulsed current flow at said low frequency through said inductance coil to produce pulsed magnetic fields in said axle in response to low pressure in said tire, a receiving coil mounted on said axle with the axis thereof parallel to the axis of said axle and linked to magnetic flux passing through said axle for production of signal pulses from said inductance coil when said tire pressure is low, and a circuit including an indicator means connected to said receiving coil for signaling the existence of low tire pressure.

References Cited in the file of this patent

UNITED STATES PATENTS

| | | |
|---|---|---|
| 1,486,209 | Wesche | Mar. 11, 1924 |
| 2,040,375 | Guthrie | May 12, 1936 |
| 2,072,454 | Jackson | Mar. 2, 1937 |
| 2,495,511 | Dolberg | Jan. 24, 1950 |
| 2,593,600 | Pike | Apr. 22, 1952 |
| 2,629,086 | Ainsworth | Feb. 17, 1953 |
| 2,802,067 | Zawels | Aug. 6, 1957 |

UNITED STATES PATENT OFFICE
CERTIFICATE OF CORRECTION

Patent No. 3,016,515 January 9, 1962

Gerald C. Summers et al.

It is hereby certified that error appears in the above numbered patent requiring correction and that the said Letters Patent should read as corrected below.

Column 1, line 21, for "strcture" read -- structure --; column 5, lines 68 and 69, for "opposide" read -- opposite side --; column 6, line 54, for "recevier" read -- receiver --;

Signed and sealed this 19th day of June 1962.

(SEAL)
Attest:

ERNEST W. SWIDER
Attesting Officer

DAVID L. LADD
Commissioner of Patents